June 18, 1963   G. J. FAIRBANKS   3,094,142
LIMITED VOLUME SAFETY VALVE
Filed July 20, 1960
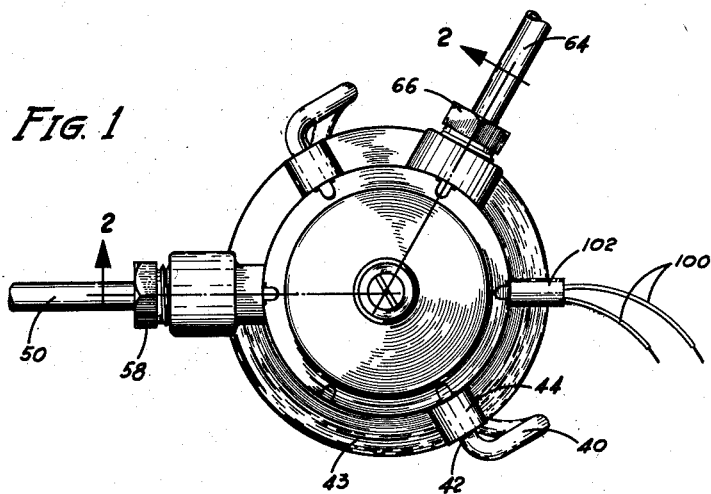
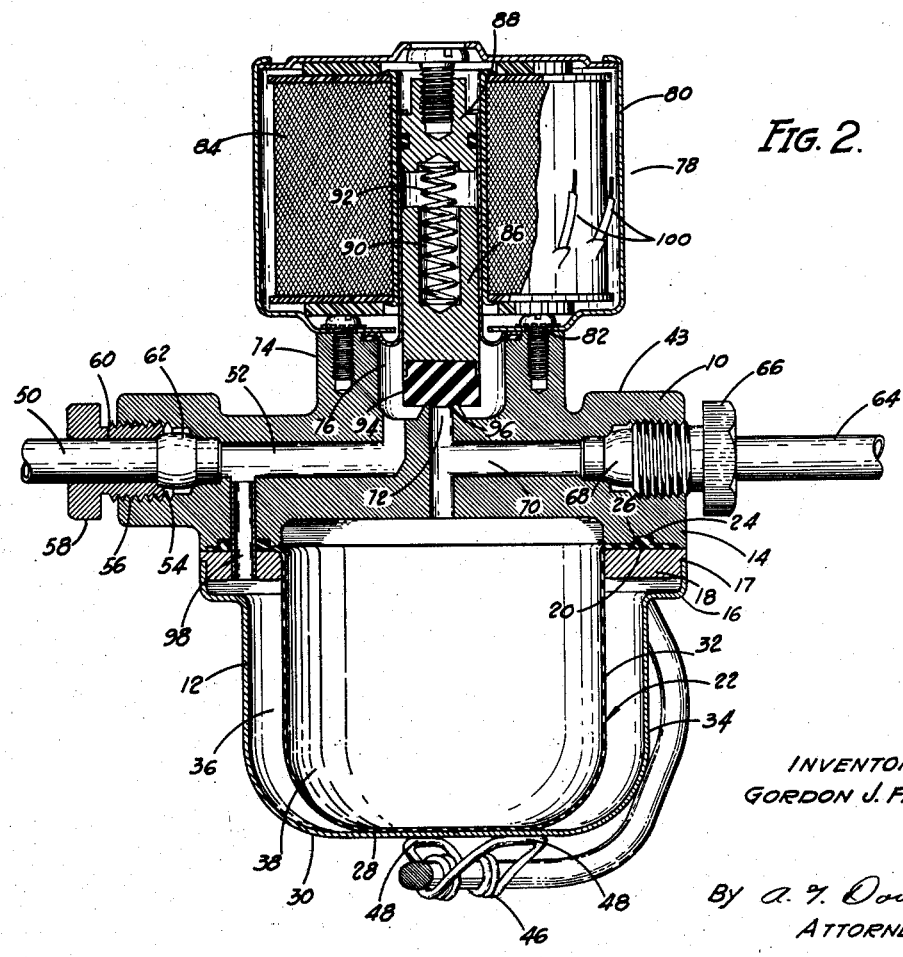
INVENTOR
GORDON J. FAIRBANKS
By a. f. Douglas
ATTORNEY

United States Patent Office 3,094,142
Patented June 18, 1963

1

3,094,142
LIMITED VOLUME SAFETY VALVE
Gordon J. Fairbanks, Indianapolis, Ind., assignor to Stewart-Warner Corporation, Chicago, Ill., a corporation of Virginia
Filed July 20, 1960, Ser. No. 44,113
4 Claims. (Cl. 137—564.5)

The present invention relates to a safety fuel system of the type disclosed in United States Patent 2,568,107 issued to George W. Allen on September 18, 1951, and more particularly, to an improved limited volume safety valve employed in such systems.

In systems of this type a quantity of fuel is isolated for starting purposes, and this quantity of fuel is supplemented by an additional fuel supply connection to be used only in the event that the fuel-consuming device operates promptly. The system makes use of a limited volume safety valve including means forming a hollow casing with the internal walls defining a closed space. The space is normally divided by means of a flexible metallic diaphragm to form a pair of fluid receiving chambers. The valve structure incorporates, within one of the chambers, a compression spring which is adapted to exert a force on the diaphragm tending to move it in a direction such that the other chamber is of relatively small volume while the chamber including the spring is of relatively large volume, when the diaphragm is subjected to balanced hydraulic pressures on opposite sides of the diaphragm. The chamber on the side of the diaphragm not including the biasing spring, continuously receives the liquid fuel under pressure from an external source, with this fuel adapted to pass to an outlet connection through a suitable communication means. The same communication means allows a portion of the fuel to enter the second chamber, that is the chamber including the biasing spring, and a suitable solenoid-operated valve is positioned within the communication line to prevent the fuel from flowing from the inlet connection to the outlet connection, as well as from the inlet connection into the second chamber. Upon starting of the heater, the solenoid valve is de-energized and the only fuel available to supply the heater is that within the second chamber including the biasing spring. With such a valve, unless the solenoid is energized and the valve positioned in the communication line is opened, the fuel pressure exerted on the opposite side of the first chamber will force the spring to collapse as the fluid is exhausted from this chamber. Thus, only a limited volume of fuel is supplied to the heater unless ignition occurs.

The specific magnetic bypass safety valve employed by Allen, comprises a two-part casing in which the enclosure holding the two pressure chambers consists of two back-to-back, semi-elliptical castings forming an oval, closed space, with a metallic diaphragm positioned so as to extend across the closed space at the center thereof. In order that one of the two chambers formed by the diaphragm and the two semi-elliptical castings is normally small while the other is relatively large, spring means are positioned between one of the casing members and the diaphragm, tending to force the diaphragm close to the other casing when the diaphragm is subjected to balanced hydraulic pressure on either side thereof. In addition to the requirement for a base portion at the center of one of the casings, in order to securely mount the spring member, there is also the need to provide a resilient element at the center of the diaphragm to prevent the inner end of the compression spring from wearing the diaphragm through at this point.

In the operation of a device such as that employed in the system for Allen, with the diaphragm subjected to equal hydraulic pressure, the compression spring tends to bias

2 the diaphragm to the side of the enclosed space opposite that of the compression spring. The hydraulic fluid, in this case liquid fuel, enters the valve body through a suitable inlet and is directed to the normally smaller of the two chambers. Suitable conduits are provided whereby the liquid fuel passes from the first chamber into an outlet conduit and on to the burner. A by-pass connects this communication line with the larger of the two chambers containing the compression spring. The solenoid-operated valve is located within the connecting means and adapted to shut off or prevent the liquid fuel from passing out of the first chamber and into the outlet conduit. Likewise, the inlet conduit or supply is cut off from the chamber carrying the compression spring. The diaphragm will normally occupy a position close to the casing body on the side of the diaphragm, away from that carrying the spring. The second chamber, carrying the compression spring, will be completely filled with liquid fuel. As long as the heater is burning, the fuel will continuously enter through the inlet connection and pass out through the outlet connection without any movement of the diaphragm. When the system is shut down, that is during non-operation of the heater, the electrical circuit forming a portion of the system acts to close the solenoid-operated valve positioned within the communication or outlet passage. Under such circumstances, the heater is completely shut off, with the diaphragm still remaining in the position above, since it is under fluid pressure equilibrium due to the fuel being on both sides of the diaphragm in the two chambers. During subsequent starting of the heater, the system will draw fuel from the larger chamber including the compression spring, since the inlet or supply conduit is cut off from the outlet conduit by the solenoid-operated valve. Under such an arrangement, as the heater draws the limited fuel supply from the large chamber carrying the spring, there no longer exists a liquid or hydraulic balance between the two chambers and the pressurized fuel within the small chamber connected to the inlet conduit will force the diaphragm inwardly against the compression spring in spite of its bias, exhausting the contents from within the large chamber to the heater. If the heater fails to start, there will be no normal momentary delay in energization of the solenoid-operated valve and the valve will remain closed, preventing further fuel supply to the heater. In such a case, the operator is fully aware that there is a fault somewhere within the system and that action must be taken. At the same time, only a limited amount of fuel has been delivered to the heater and the danger of a possible explosion taking place, upon the re-ignition, is prevented. Likewise, any waste of fuel is prevented by this type of system.

While the safety fuel valve of the type shown in the Allen patent operates satisfactorily in systems of this type, these valves require a pair of accurately-formed, rather bulky die-castings which must be machined for accuracy and require screw-fitted fastenings to hold the two concave casing elements together. In addition, employment of a metallic diaphragm which is peripherally held by the same screw-threaded fasteners between the cast housing elements requires relatively large die-castings, since the device incorporates a compression spring and its associated resilient pad at the center of the diaphragm, between these elements. In addition, the use of the screw-threaded fasteners results in a somewhat lengthy process in the removing or cleaning of the diaphragm and its associated chambers.

It is, therefore, the primary object of this invention to provide an improved limited volume safety valve for a fuel system in which the valve is constructed of die-castings which are smaller, of light-weight construction, and in which the need for accurate, machined fasteners is eliminated.

It is the further object of this invention to provide an improved limited volume safety valve for a heater-fuel system in which the relatively expensive metallic diaphragm, its associated compression spring, and buffer element is completely eliminated.

It is the further object of this invention to provide an improved limited volume safety valve for use with a heater-fuel system in which the elements forming the closed fluid chambers may be readily and instantaneously assembled and dis-assembled.

It is the further object of this invention to provide an improved limited volume safety valve for a heater-fuel system wherein the resilient diaphragm of said valve includes self-sealing means for sealing the die-casting elements making up the valve structure.

It is another object of this invention to provide an improved limited volume safety valve for a heater-fuel system which is of a more compact shape and size to thereby facilitate mounting and installation.

Other objects of this invention will be pointed out in the following detailed descriptions and claims and illustrated in the accompanying drawing which discloses, by way of example, the principle of this invention and the best mode which has been contemplated of applying that principle.

In the drawings:

FIGURE 1 is a top plan view of the limited volume safety valve forming one embodiment of this invention;

FIGURE 2 is a sectional elevation taken along line 2 of FIGURE 1.

In general, the apparatus of this invention comprises: a flat, horizontally-positioned, somewhat thickened plate member, which includes an integral downwardly extending, annular flange portion. A generally cup-shaped casing member is positioned adjacent the flat plate member, with the lips of the cup-shaped member contacting the annular flange. The flat plate member and the cup-shaped housing member define a closed space, and a flexible, cup-shaped, moulded rubber bag is positioned within the closed space. The moulded, flexible bag normally occupies a position adjacent the cup-shaped housing and spaced slightly therefrom when balanced hydraulic pressures are exerted on opposite sides of the flexible bag to divide the closed space into a first fluid chamber of relatively small volume and a second fluid chamber of relatively large volume. Conduit means are provided within the thickened plate member for forming an inlet to the first chamber for delivering liquid fuel under pressure to said chamber from an external source. An outlet connection is also provided within said plate member and is in direct connection with both chambers. A solenoid-operated valve is so positioned in the outlet connection as to close communication between the first chamber and the outlet connection such that during the initial ignition of the burner, the liquid fuel is delivered to the outlet connection only from the second chamber and fuel is prevented from reaching the burner through the inlet connection, except upon energization of the solenoid. Such energization is controlled by thermostatic means associated with said burner.

Referring to the drawing, the limited volume safety valve of the present invention includes two main housing elements, a generally thickened, annular plate member 10 which as shown in the drawing is normally positioned along a horizontal plane, and a second, generally cup-shaped housing member 12 which together form a closed space. Both the plate member 10 and the cup-shaped housing member 12 are of cast metal construction. The annular plate member 10 includes a downwardly projecting annular flange portion 14 which is adapted to contact the lip 17 of the cup-shaped housing member 12. In this respect, the cup-shaped housing member 12 is bent outwardly at the upper end thereof to form a curved or flanged portion 16, the portion 16 being integral with the main portion of the cup 12. The lip 17 of the cup-shaped housing member 12 is rigidly joined to an annular member 18 which is also of metal, or the like, provided to form sufficient contact surface between the annular flange portion 14 and the cup-shaped housing member 12. Sandwiched between the annular member 18 and the annular flange portion 14 is the peripheral edge 20 of a moulded flexible rubber bag 22 which takes the place of the metallic diaphragm used in the prior art structures. In order to effect proper sealing between the plate member and the cup-shaped housing member, the peripheral edge 20 of the flexible moulded rubber bag is provided with a beaded portion as at 24 which cooperates with a suitable groove 26 formed integrally within the annular flange portion 14 of the plate member 10.

The flexible, rubber bag is moulded into a cup-shaped configuration similar to the configuration of the cup-shaped housing member 12 and is adapted to lie within the closed space formed by the plate member and the housing member with the bottom 28 of the moulded rubber bag 22 contacting the bottom 30 of the cup-shaped housing member 12. The diameter of the rubber bag 22 is somewhat less than the diameter of the housing member 12 and while the rubber bag conforms closely to the cup-shaped housing member, the sides 32 of the bag are spaced slightly from the sides 34 of the cup-shaped housing member 12. It is apparent, therefore, that the particular moulded configuration given to the flexible rubber bag acts to divide the closed space into a first fluid chamber 36 of relatively small volume and a second internal, fluid chamber 38 of relatively large volume.

While previous constructions employed a plurality of threaded screw members for holding the two housing members together as well as the diaphragm sealed between said elements, the present invention advantageously makes use of resilient means for frictionally securing the elements together without requiring the necessity of accurately-machined parts and alignment precautions. In the present invention, during the assembling of the apparatus, the moulded rubber bag is positioned within the cup-shaped housing member with the bead 24 so placed, that subsequent contact with the cup-shaped housing member will result in securing the bead 24 within its cooperating circular groove 26. At this time, the bottom of the bag 28 will be in contact with the bottom of the cup-shaped housing member 30. As best seen in FIGURE 1, a generally U-shaped, spring clamping member 40 is so positioned, as to surround the cup-shaped housing member 12 and includes inwardly directed terminal portions 42 at the upper end thereof, which extend over the upper edge 43 of the thickened annular plate member 10. The terminal portions 42 are pivotably held on the upper edge 43 of the thickened annular plate member by suitable support means 44, allowing the U-shaped clamp to be rotated within the support means 44 a full 90 degrees for removing the cup-shaped housing member 18 and its associated moulded rubber bag 22 from the thickened annular plate member 10. In order to provide the required resilient biasing force between the two elements, there is further provided a wire-spring element 46 including a pair of spring contact portions 48 which continuously bear against the bottom of the cup-shaped housing member 12.

It is apparent that since the cup-shaped housing member 12 has a flattened bottom portion 28 and there will be a point where the spring force exerted by spring member 46 is greatest as the clamping member pivots around the housing member 12, this point occurring at the outer peripheral edge of the bottom of the cup-shaped housing member. Thus, as the U-shaped clamp 40 is swung down and around the cup-shaped member 12, the force exerted by the spring 46 will gradually increase to a maximum and then decrease as the U-shaped clamp is swung into its final position. The snap action aids in securely locking the two housing members together while sealing said members by means of the peripheral bead formed on the edge of the moulded rubber bag.

In like manner to the apparatus shown in the Allen patent, the fuel is delivered to the safety valve through an inlet conduit 50. The thickened annular plate member 10 includes a generally horizontal bore 52 which extends radially inward toward the center thereof. The outer end of bore 52 is enlarged at 54 and is screw-threaded at 56 to receive a flanged clamping member 58 which includes a smooth bore 60 adapted to closely receive conduit 50. The end of conduit 50 includes a thickened, rounded flange 62 which effectively provides a seal between bore 52 and conduit 50 by simply drawing the clamping member 58 into recess 54. In like manner, a second horizontal bore 70 extends radially inward and is connected to an outlet conduit 64 positioned horizontally at an angle of approximately 120 degrees to that of the inlet conduit as best seen in FIGURE 1, and is secured to the thickened annular plate member 10 by means of the screw-threaded clamping member 66. The conduit 64 is likewise provided with a thickened, rounded flange portion 68 for sealing purposes. At the center of the thickened annular plate member, a vertically-extending bore, or communication line 72 is formed at right angles to the bore 70 and is connected thereto. The upper portion of the thickened annular plate member 10 includes a second circular flange 74 which is of somewhat less diameter than flange 14, to provide a valve body or cavity 76. A suitable solenoid 78 is coaxially positioned adjacent the valve body 76, and is provided with a suitable casing 80. Screw threaded coupling means 82 are provided for coupling the solenoid to the circular flange 74. Solenoid 78 includes a stationary electrical coil or winding 84 which surrounds a central, reciprocating plunger or armature 86. A suitable end cap 88 is provided within the upper end of the solenoid and the plunger 86 includes a central bore 90 which is adapted to receive compression spring 92. The compression spring 92 acts to bias the plunger 86 downwardly within the valve body 76 but the magnetic attraction set up by the solenoid coil is sufficient to overcome the bias of spring 92, and attract the plunger 86 upwardly within the solenoid coil. The lower tip of plunger 86 is provided with a resilient cap 94 which is biased against valve seat 96 when the solenoid is de-energized. The valve body 76 receives liquid fuel through inlet conduit 50 and bore 52, the liquid fuel passing through outlet conduit 64 and into the larger liquid fluid chamber 38 through vertical bore 72. Even with the valve member 94 closed upon valve seat 96, the second chamber 36 of relatively small volume is still connected to the inlet conduit 50 through a vertical conduit 98 which extends downwardly through the thickened annular plate member 10 and the annular member 18. Energization of the solenoid is effected by current passing through leads 100 which extend from the valve through a suitable terminal member 102. While the valve is shown as employing a solenoid to move the reciprocating valve member, this means of providing the required valve action is merely indicative of one type of energization that may be employed in such systems.

While the present improved limited volume safety valve operates in a similar manner to the valve employed in the patent to Allen 2,568,107, a brief description of the operation of this valve is as follows:

Assuming that the heater has been inoperative for a period of time, and it is desirous to ignite the heater, the limited volume safety valve will be in a position indicated in FIGURE 2. As such the larger, fluid chamber 38 will have a supply of liquid fuel therein which is in direct communication with the outlet 64 through the vertical bore 72 and the horizontal bore 70. Likewise, liquid fuel entering inlet conduit 50 will be in direct communication with the valve body 76 as well as in direct connection with the second fluid chamber 36. At this time, there will be provided a hydraulic balance with respect to the moulded flexible rubber bag 22, and because of the moulded construction, the bag will inherently be in its extended position as indicated in FIGURE 2, with the bottom 28 contacting the bottom 30 of the cup-shaped housing member 12. If, at this instant, the heater is turned on and fuel flows from the chamber 38 through vertical conduit 72 and horizontal conduit 70 to the outlet conduit 64 there will be sufficient fuel within the chamber 38 to allow the burner to ignite. However, should for some reason ignition fail, thermostatic means (not shown) will fail to initiate a current supply through leads 100 to the solenoid coil 84. As a result, the valve 94 will not lift off the valve seat 96 to allow further supply of liquid fuel from inlet conduit 50 to pass through the various bores 52, 70 and 72 and the valve body 76 to the outlet conduit 64. At the same time, since liquid fuel is being exhausted from the fluid chamber 38 through conduit 64, a pressure differential is created across the moulded rubber bag 22, and with the relative decrease in pressure within chamber 38, the pressurized liquid fuel within chamber 36 will cause the bag 22 to deform, forcing the liquid from chamber 38 to be exhausted through the outlet conduit 64 to the burner. Once the measured amount of liquid fuel has been delivered to the burner, without proper ignition, the solenoid-operated valve 94 will remain seated against valve seat 96 effectively preventing all but the measured amount of fuel from being delivered to the burner. Under normal circumstances, before the fuel is exhausted from the large volume fluid chamber 38, the solenoid will be energized and the valve 94 opened allowing continuous delivery of liquid fuel from inlet conduit 50 to outlet conduit 64, and subsequently to the burner (not shown). Upon energization of the solenoid in opening of the valve 94, liquid fuel from inlet conduit 50 will enter the inner chamber 38 and with balanced fuel pressure on either side of the flexible moulded rubber bag, the bag will attain its previous shape as provided by the moulding process, such that the bag will conform closely to the configuration of the cup-shaped housing member 12. Thus, the present invention advantageously does away with the necessity for a biasing spring and the use of the metallic diaphragm as well as the relatively large castings as employed in the previous systems.

It should be noted also that the flow path from the inlet 50 to the outlet 64 is through the passages 52, 76, 72 and 70. As is commonly known, the Bernoulli equation of state of a fluid under steady flow conditions provides that the stagnation pressure of the fluid is equal to the sum of the static pressure and the velocity pressure. The bore 98 communicating with the flow path 52 transversely thereof is effective to measure and to transmit to chamber 36 only the static pressure of the fuel in open flow condition of valve. On the other hand, bore 72 being in the flow path and opening directly into chamber 38 acts in such a manner that the chamber 38 receives the full stagnation pressure of the fuel including the static pressure and the velocity pressure. This communication arrangement to the chambers 36 and 38 thus tends to compensate during flow conditions for stagnation pressure drop in the flow bores between the inlet 50 and the chamber 38.

While there have been shown and described and pointed out the fundamental novel features of the invention as applied to a preferred embodiment, it will be understood that the various omissions and substitutions and changes in the form and details of the device illustrated and in its operation, may be made by those skilled in the art without departing from the spirit of the invention. It is the intention, therefore to be limited only as indicated by the scope of the following claims.

What is claimed is:

1. A fuel safety device comprising a generally flat plate member including a circular flange portion on one side thereof having a circular groove, a generally cup-shaped housing member having its open end coupled to said circular flange by frictional engagement therewith, means for resiliently biasing said cup-shaped housing member against said flat plate member, said flat plate member and said cup-shaped member defining a closed space, a molded flexible bag positioned within said first space and normally occupying a position adjacent said cup-shaped housing member and spaced slightly therefrom when balanced hydraulic pressures are exerted on opposite sides thereof, to divide said closed space into a first chamber of relatively small volume between said cup-shaped housing member and said flexible bag and a second chamber of relatively large volume between said flexible bag and said flat plate, said molded flexible bag having an integral bead formed at its outer edge along the inner surface thereof, said bead being positioned within said circumferential groove on the circular flange portion of said flat plate member to provide a seal between said flat plate member and said housing member, means forming an inlet to the first chamber for delivering fluid under pressure thereto from an external source, means forming a direct connection between both chambers, means forming an outlet in communication with said second chamber, and valve means in said direct connection forming means.

2. A fuel safety device comprising a generally flat plate member including a circular flange portion on one side thereof, a generally cup-shaped housing member having its open end coupled to said circular flange by frictional engagement therewith, means for resiliently biasing said cup-shaped housing member against said flat plate member, said flat plate member and said cup-shaped member defining a closed space, a molded flexible bag positioned within said first space and normally occupying a position adjacent said cup-shaped housing member and spaced slightly therefrom when balanced hydraulic pressures are exerted on opposite sides thereof, to divide said closed spacing into a first chamber of relatively small volume between said cup-shaped housing member and said flexible bag and a second chamber of relatively large volume between said flexible bag and said flat plate, the outer lip of said molded flexible bag being supported between the cup-shaped housing member and said flange portion of said flat plate member, means forming an inlet to the first chamber for delivering fluid under pressure thereto from an external source, means forming a direct connection between both chambers, means forming an outlet in communication with said second chamber, and valve means in said direct connection forming means.

3. A fuel safety device comprising a generally flat plate member including a circular flange portion on one side thereof having a circular groove, a generally cup-shaped housing member having its open end coupled to said circular flange portion by frictional engagement therewith, means for resiliently biasing said cup-shaped housing member against said flat plate member, said flat plate member and said cup-shaped member defining a closed space, a molded flexible bag positioned within said first space and normally occupying a position adjacent said cup-shaped housing member and spaced slightly therefrom when balanced hydraulic pressures are exerted on opposite sides thereof, to divide said closed space into a first chamber of relatively small volume between said cup-shaped housing member and said flexible bag and a second chamber of relatively large volume between said flexible bag and said flat plate, said molded flexible bag having an integral bead formed at its outer edge along the inner surface thereof, said bead being positioned within said circumferential groove on the circular flange portion of said flat plate member to provide a seal between said flat plate member and said housing member, means forming an inlet to the first chamber for delivering fluid under pressure thereto from an external source, means forming an outlet connection in direct communication with both chambers, and valve means in said outlet connection to close communication between said first chamber and said outlet connection.

4. A fuel safety device comprising a generally cup-shaped housing member having internal walls defining a closed space, a molded flexible bag positioned within said housing and normally occupying a position adjacent said internal walls and spaced slightly therefrom when balanced stagnation fuel pressures are exerted on opposite sides thereof to divide said closed space into a first chamber of relatively small volume and a second chamber of relatively large volume, means forming an inlet, means forming a flow connection between said inlet and said second chamber for delivering fuel under stagnation pressure thereto, means forming a separate connection open transversely to the flow connection for communicating the static pressure of the fuel therein to the first chamber, said connections tending to compensate during flow conditions for stagnation pressure drop in the flow connection between the inlet and said second chamber, means forming an outlet from said second chamber, and valve means in said flow connection downstream of the separate connection.

References Cited in the file of this patent

UNITED STATES PATENTS

| | | |
|---|---|---|
| 2,405,614 | Shriro | Aug. 13, 1946 |
| 2,568,107 | Allen | Sept. 18, 1951 |
| 2,625,886 | Browne | Jan. 20, 1953 |

FOREIGN PATENTS

| | | |
|---|---|---|
| 317,607 | Switzerland | Jan. 15, 1957 |